Nov. 22, 1955  L. S. BARNISH  2,724,490
SUPPORTING STRUCTURE FOR TROUGHING BELT CONVEYORS
Filed March 29, 1954  2 Sheets-Sheet 1
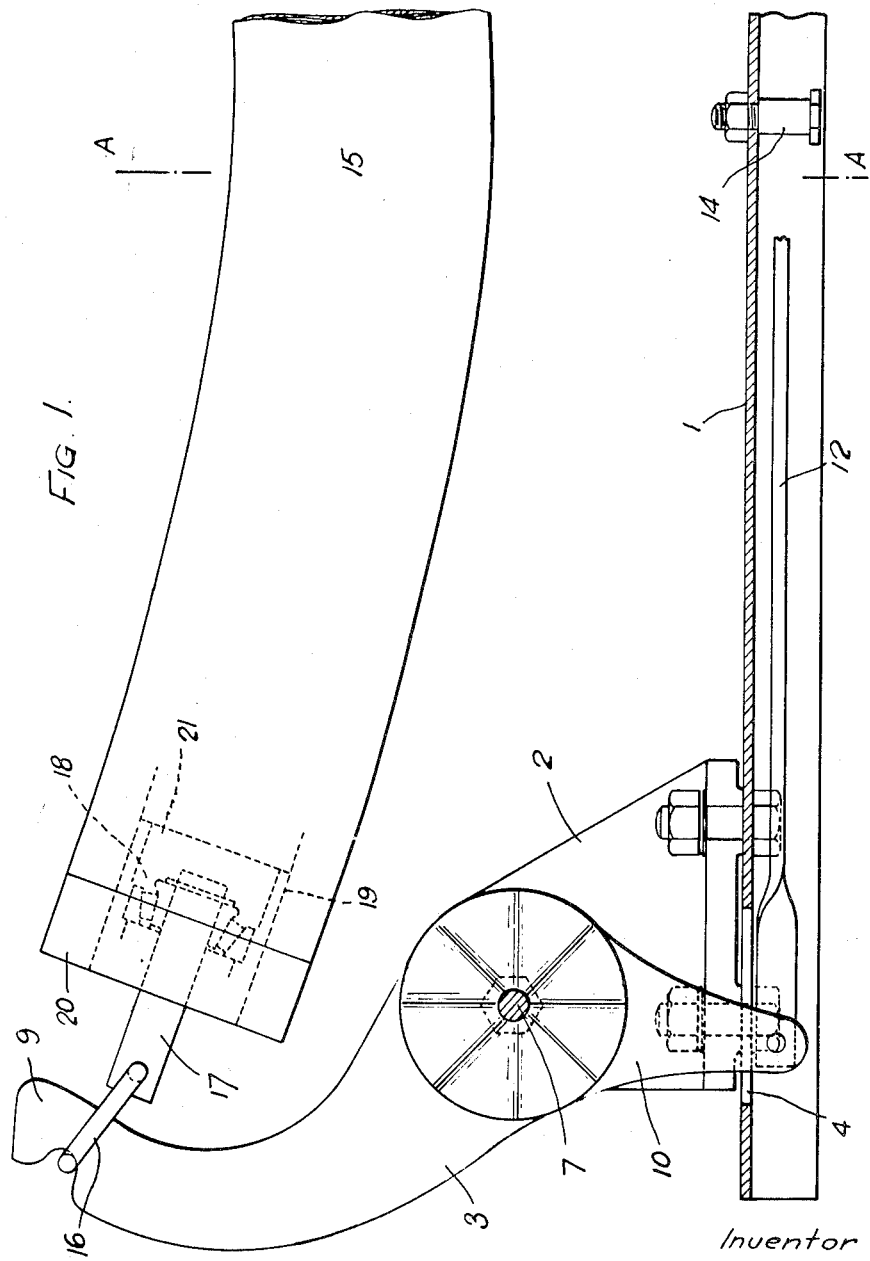
Inventor
LEONARD S. BARNISH
By
ATTORNEY Nov. 22, 1955                L. S. BARNISH                2,724,490
SUPPORTING STRUCTURE FOR TROUGHING BELT CONVEYORS
Filed March 29, 1954                           2 Sheets-Sheet 2
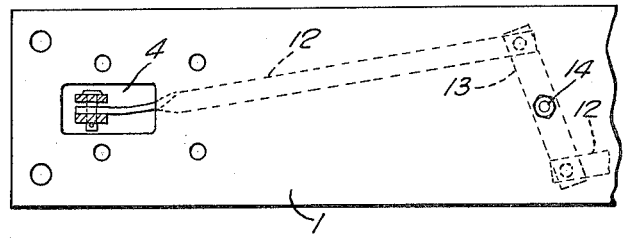
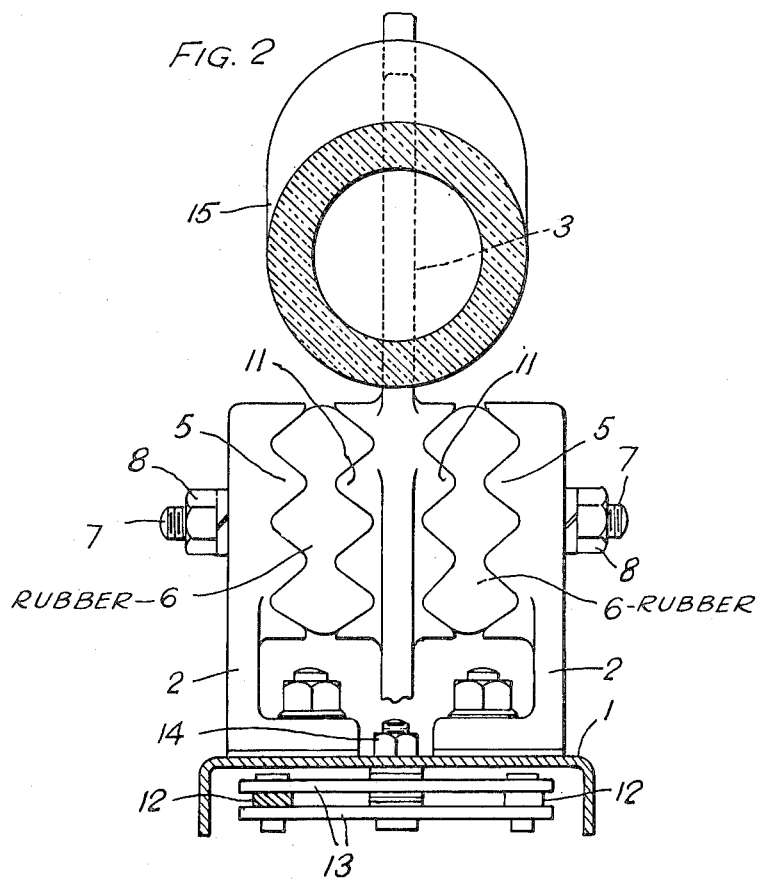
INVENTOR
Leonard S. Barnish
Attorneys

United States Patent Office 2,724,490
Patented Nov. 22, 1955

2,724,490

SUPPORTING STRUCTURE FOR TROUGHING BELT CONVEYORS

Leonard Sinclair Barnish, Johannesburg, Transvaal, Union of South Africa, assignor to Richard Sutcliffe Limited, Wakefield, England, a British company Application March 29, 1954, Serial No. 419,269

Claims priority, application Great Britain March 31, 1953

8 Claims. (Cl. 198—192)

This invention relates to supporting structures for belt conveyors and has particular reference to structures with idler rollers for supporting the belts of such conveyors.

According to the present invention a supporting structure for a belt conveyor comprises a supporting roller which is rotatably mounted between two arms each supported between resilient bushes which are in contact with the sides of the arms.

In one particular embodiment of the invention the resilient bushes are of rubber and are held between mounting brackets secured to a base plate of the structure. The bushes are normally under compression. Pivot bolts pass centrally through the mounting brackets, bushes and arms and are provided with nuts adjustable to vary the compression of the bushes. Variations in the compression of the bushes change the degree of troughing produced by a load on a belt conveyor supported by the supporting roller.

As an example of the invention a supporting roller constructed in accordance therewith will now be described in greater detail with reference to the accompanying drawings of which Fig. 1 is a front elevation partly in section with a bracket removed, Fig. 2 is a cross section on the line A—A of Fig. 1 and Fig. 3 is a plan view of a base plate.

Bolted to a base plate 1 adjacent each end thereof are two pairs of mounting brackets 2 each bracket being of substantially L shaped cross section. The base portions of each bracket of a pair are separated slightly from one another to allow the lower ends of supporting arms 3 to pass through corresponding slots 4 in the base plate 1. The upper ends of the mounting brackets are formed with inwardly directed fluted surfaces 5 which accommodate resilient bushes 6. The bushes 6 are not bonded to the fluted surfaces 5 or to the sides of the arms 3. Pivot bolts 7 pass centrally through the fluted surfaces. The bushes are preferably of a rubber material and are normally under compression. The pivot bolts 7 have nuts 8 on each end. The nuts are screwed in and out to change the compression in the bushes.

The supporting arms each have an upper curved part terminating in a hook like portion 9 and a lower part 10 whose extremity is pivotally secured to a linkage to be referred to in more detail later. The width of the supporting arms increases considerably in the vicinity of the pivot point so as to provide an adequate contact surface for the bushes. Each side of the supporting arms in the vicinity of the pivot point is formed with a fluted surface 11 to give a better grip to the rubber.

The linkage referred to above comprises two levers 12 each having one end pivotally secured to the extremity of the part 10 of the supporting arms and the other end to one end of a cross link 13 pivotally mounted beneath the base plate on a bolt 14 which passes centrally through the cross link and is secured on the base plate.

A hollow idler roller 15 preferably formed of a flexible tube is held between the supporting arms by means of two single chain links 16 one at each end of the roller. Each link 16 passes through the hook like portion 9 in the upper part of the supporting arms and through an eye in a shaft 17 which projects into the roller and on which the inner race of a roller bearing 18 is mounted. The outer race of the bearing is in a housing 19 inserted into the end of the idler roller. The exterior surface of the housing is grooved (not shown) as is the inner surface of the roller, the housing being held within the roller by the inter-engagement of the grooves and by a steel ring or band 20 which is fitted over the end of the roller. The housing also contains an oil seal (not shown) which prevents leakage from the housing of lubricating oil fed to the roller bearings along a passage in the shaft. The inner end of the housing is sealed by a disc 21 held in position in the housing by a circlip.

The nuts 8 on the pivot bolts 7 are adjusted so that the compression of the bushes allows the flexible roller to "trough" to a required degree under varying loads. The degree of "troughing" may also be varied in accordance with the length of the idler roller 15.

In operation, the belt of an endless belt conveyor is supported by a number of idler rollers and a load of loose material such as coal on the belt causes the rollers to trough, the amount being determined by the compression in the rubber bushes as determined by the nuts 8. Pivotal movement of the arms causes the rubber bushes 6 to be subjected to torsion since the fluted surfaces 5 and 11 prevent slip between these surfaces and the bushes. The pivot bolts 7 provide a pivotal axis for the supporting arms but otherwise take no part in the actual pivoting of these arms. The troughing causes the supporting arms to pivot and the pivotal movement is equalised by the linkage inter-connecting the lower ends of the supporting arms. The equalised pivotal movement of the arms tends to centralise the material on the belt so that the possibility of material fall off is very reduced.

It will be appreciated that by curving the upper part of each supporting arm the overall width of the complete structure is reduced to a minimum. Furthermore, the "troughing" of the roller under load is easily varied by means of the adjusting nuts on the pivot bolts which are immediately accessible.

Although in the embodiment described above the bushes are merely held in contact with the fluted surfaces of the arms and brackets, a bonding process may be used to secure the bushes to these surfaces. Furthermore, it may be found desirable to fit two sets of bearings to ensure proper support for each of the shafts projecting from the ends of the roller.

I claim:

1. A supporting structure for a belt conveyor comprising in combination a base, two supporting arms spaced apart at least the width of a conveyor belt, mounting brackets for said arms on which the arms are pivotally mounted for movement towards and away from one another, the brackets being secured to the base, resilient bushes positioned between the sides of the arms and the mounting brackets, the bushes being subjected to torsion on pivotal movement of the arms, and a flexible roller rotatably mounted on bearings supported between the supporting arms.

2. A supporting structure according to claim 1 in which each arm is supported between two resilient bushes.

3. A supporting structure according to claim 2 in which the two resilient bushes supporting each arm are held between a pair of mounting brackets secured to the base.

4. A supporting structure according to claim 1 in which that part of each arm and each bracket in contact with a resilient bush is fluted.

5. A supporting structure according to claim 1 in which a pivot bolt passes through the bushes and the mounting brackets and is fitted with nuts for varying the compression on the bushes.

6. A supporting structure according to claim 1 in which the supporting roller is a flexible hollow tube.

7. A supporting structure according to claim 1 in which each arm has a curved upper portion terminating in a hook like portion.

8. A supporting structure according to claim 1 in which each arm has a lower portion whose extremity is pivotally secured to a member forming part of a linkage interconnecting the supports.

References Cited in the file of this patent
UNITED STATES PATENTS 909,833     Vrooman _____ Jan. 12, 1909